(12) United States Patent
Cunningham et al.

(10) Patent No.: US 7,584,905 B2
(45) Date of Patent: Sep. 8, 2009

(54) FUEL COMBUSTION CATALYST MICROBURST AEROSOL DELIVERY DEVICE AND CONTINUOUS AND CONSISTENT AEROSOL DELIVERY DEVICE

(75) Inventors: Emmett Manuel Cunningham, Phoenix, AZ (US); George M. Malouf, Irvine, CA (US); Russ Webster, Wilcox, AZ (US); Kevin Hong, Rowland Heights, CA (US); Xiong Pei Li, ShenZhen (CN)

(73) Assignee: Emissions Technology, Inc., Scottsdale, AZ (US)

( * ) Notice: Subject to any disclaimer, the term of this patent is extended or adjusted under 35 U.S.C. 154(b) by 216 days.

(21) Appl. No.: 11/269,376

(22) Filed: Nov. 7, 2005

(65) Prior Publication Data

US 2006/0112906 A1    Jun. 1, 2006

Related U.S. Application Data

(60) Provisional application No. 60/634,095, filed on Dec. 8, 2004, provisional application No. 60/625,769, filed on Nov. 8, 2004.

(51) Int. Cl.
*F02M 25/00*   (2006.01)
*B05B 1/08*    (2006.01)
*F02B 51/02*   (2006.01)

(52) U.S. Cl. .................. 239/338; 239/67; 239/102.2; 239/326; 123/25 E; 123/670

(58) Field of Classification Search ............... 239/338, 239/102.2, 67, 326, 71, 102.1, 302, 337, 239/340, 341, 346, 350, 369, 370; 123/25 E, 123/670, 198 A, 272, 498, 536; 431/4

See application file for complete search history.

(56) References Cited

U.S. PATENT DOCUMENTS

| 1,989,113 | A | 1/1935 | Rector ..................... 123/1 A |
| 2,460,700 | A | 2/1949 | Lyons ..................... 123/1 A |
| 3,790,139 | A | 2/1974 | Stephenson et al. ........ 261/18.2 |
| 3,856,901 | A | 12/1974 | Neumann et al. .......... 261/18.2 |

(Continued)

FOREIGN PATENT DOCUMENTS

GB        2398521      12/2005
WO    WO 03/068413 A1 *  8/2003

*Primary Examiner*—Darren W Gorman
(74) *Attorney, Agent, or Firm*—Fennemore Craig, P.C.

(57) ABSTRACT

Efficient fuel combustion catalyst delivery device and method are provided. A fuel combustion catalyst delivery device includes a storage vessel that contains a liquid. The liquid includes one or more catalytic materials. The storage vessel is attached to a nebulizer that can convert the liquid to an aerosol to be delivered into an air intake of a combustion zone. The aerosol can accelerate fuel combustion. The storage vessel and the nebulizer are made from materials suitable to be exposed to the liquid and the aerosol. The storage vessel and the nebulizer are also suitable to be placed in proximity to the combustion zone such as an engine compartment so that the aerosol can be delivered into the air intake of the combustion zone easily and effectively. The surfaces of the delivery device exposed to the liquid or the aerosol may be made of corrosion-resistant or inert materials if the liquid is acidic. The surfaces of the delivery device exposed to the liquid or the aerosol may be also made from materials that produce substantially no contaminants into the liquid. The nebulizer may convert the liquid to an aerosol at a rate between once per second and one hundred times per second. The nebulizer may have holes for passing the liquid where each of the holes has a size not greater than about 10 μm. The delivery device can deliver up to 500 ml or more of liquid as aerosol over 500 hours of operation.

23 Claims, 5 Drawing Sheets

U.S. PATENT DOCUMENTS

| | | | |
|---|---|---|---|
| 3,875,922 A | 4/1975 | Kirmss, Jr. ............... 123/198 A |
| 4,076,002 A | 2/1978 | Mellqvist et al. ........ 123/198 A |
| 4,157,316 A | 6/1979 | Thompson et al. .......... 502/304 |
| 4,170,960 A | 10/1979 | Germack et al. ........ 123/198 A |
| 4,295,816 A | 10/1981 | Robinson ....................... 431/4 |
| 4,362,130 A | 12/1982 | Robinson .................... 123/1 A |
| 4,382,017 A | 5/1983 | Robinson et al. ............ 502/169 |
| 4,440,874 A | 4/1984 | Thompson .................. 502/327 |
| 4,475,483 A | 10/1984 | Robinson .................... 123/1 A |
| 5,085,841 A | 2/1992 | Robinson ................ 423/213.5 |
| 5,525,316 A | 6/1996 | Shustorovich et al. ... 423/213.5 |
| 5,851,498 A | 12/1998 | Rozenshtein et al. ........ 422/211 |
| 6,176,701 B1 | 1/2001 | Robinson ....................... 431/4 |
| 6,296,196 B1 | 10/2001 | Denen et al. |
| 6,419,477 B1 | 7/2002 | Robinson ....................... 431/4 |
| 6,446,880 B1 | 9/2002 | Schram et al. |
| 6,602,067 B1 | 8/2003 | Robinson ....................... 431/4 |
| 6,766,817 B2 | 7/2004 | da Silva |
| 6,776,606 B2 | 8/2004 | Haskew ......................... 431/2 |
| 6,786,714 B2 | 9/2004 | Haskew ......................... 431/4 |
| 2002/0150514 A1 | 10/2002 | Haskew ....................... 422/145 |
| 2002/0165088 A1 | 11/2002 | Haskew ....................... 502/172 |
| 2003/0234012 A1* | 12/2003 | Bosteels .................... 123/670 |
| 2004/0255874 A1 | 12/2004 | Haskew et al. ............. 123/536 |
| 2005/0053875 A1 | 3/2005 | Haskew ......................... 431/4 |
| 2005/0054522 A1 | 3/2005 | Haskew ....................... 502/230 |

* cited by examiner

FUEL COMBUSTION CATALYST MICROBURST AEROSOL DELIVERY DEVICE AND CONTINUOUS AND CONSISTENT AEROSOL DELIVERY DEVICE

CROSS-REFERENCES TO RELATED APPLICATIONS

The present application claims the benefit of priority under 35 U.S.C. §119 from U.S. Provisional Patent Application Ser. No. 60/625,769 entitled "FUEL CATALYST SYSTEM WITH MICRO BURST PUMP," filed on Nov. 8, 2004 and U.S. Provisional Patent Application Ser. No. 60/634,095 entitled "FUEL CATALYST MICRO BURST PUMP MECHANISM," filed on Dec. 8, 2004, all of which are hereby incorporated by reference in their entirety for all purposes.

FIELD OF THE INVENTION

The present invention generally relates to a fuel combustion catalyst and an aerosol delivery device and, more particularly, relates to a fuel combustion catalyst microburst aerosol delivery device and a continuous and consistent aerosol delivery device.

BACKGROUND OF THE INVENTION

Motor vehicles are the major fuel consuming products and the most significant contributor to air pollution. They consume more than 25% of total United States energy and 70% of total petroleum. Vehicle pollutants have local, regional and global impacts. Fuel consumption and vehicle pollution impose a variety of health, economic, and environmental costs on society. In addition to motor vehicles, other types of vehicles (e.g., boats and airplanes) and equipment consume fuel and produce pollution.

Accordingly, a need exists for a device that can reduce fuel consumption and pollutants. A need also exists to reduce carbon build-up and soot ingestion into the oil of an engine and to extend the engine and combustion chamber life. A need also exists for a device that can deliver the proper amount of aerosol continuously over an extended period.

SUMMARY OF THE INVENTION

According to one aspect of the present invention, the method and system of the present invention offer a solution to the ever growing environmental and economic problems caused by the combustion of hydrocarbon fuels while creating an atmosphere that enhances the fuel economy of any given combustion technique. Introducing a metered catalyst material, by means of microburst ultrasonic fogging device, into the fuel combustion chamber increases the performance and efficiency of the combustion process. Introducing the correct amount of catalyst into the flame zone with the proper ratio of fuel to oxygen provides a measurable rate of success.

According to one aspect, the present invention can reduce fuel consumption, exhaust pollutants, and carbon build-up and soot ingestion into the oil of an engine, extend engine and combustion chamber life due to less wear on the components, and decrease preventive maintenance cycles for oil and filter replacements. There are numerous ways to introduce a catalyst into the combustion chamber by adding it to the fuel, but improved performance and efficiency can be achieved by introducing the catalyst into the intake air of the combustion chamber. Adding the catalyst to the intake air enables more complete atomization of the catalytic components as compared to the other methods of introducing the catalytic components, for example, with the fuel.

According to another aspect of the present invention, a fuel combustion catalyst delivery apparatus includes a storage vessel containing a liquid. The liquid includes one or more catalytic materials. The storage vessel has surfaces exposed to the liquid, and the storage vessel is for coupling to or is coupled to a nebulizer. The nebulizer is for converting the liquid to an aerosol to be delivered into an intake air of a combustion zone. The aerosol is for accelerating combustion. The aerosol also includes the one or more catalytic materials, and the nebulizer has surfaces for being exposed to the liquid or the aerosol. The storage vessel and the nebulizer are for being placed in proximity to the combustion zone to be able to deliver the aerosol into the intake air of the combustion zone. The surfaces of the storage vessel and the nebulizer are suitable to be exposed to the liquid or the aerosol, and the storage vessel and the nebulizer are suitable to be placed in proximity to the combustion zone.

According to yet another aspect of the present invention, a fuel combustion catalyst delivery apparatus includes a storage vessel containing a liquid. The liquid includes one or more catalytic materials. The storage vessel includes surfaces exposed to the liquid, and the surfaces of the storage vessel are inert to the liquid. The storage vessel is for coupling to or is coupled to a nebulizer. The nebulizer is for converting the liquid to an aerosol to be delivered into an intake air of a combustion zone. The aerosol includes the one or more catalytic materials, and the nebulizer includes surfaces for being exposed to the liquid or the aerosol. The surfaces of the nebulizer include a first surface for converting the liquid in contact with the first surface to the aerosol. The first surface is for being exposed to the liquid and the aerosol. The surfaces of the nebulizer are inert to the liquid or the aerosol, and the surfaces of the first surface are inert to the liquid and the aerosol. The surfaces of the storage vessel, the surfaces of the nebulizer and the first surface can maintain inertness for over 200 hours of operation of the nebulizer or for over 1000 hours of exposure to the liquid or the aerosol.

According to another aspect of the present invention, a fuel combustion catalyst delivery apparatus includes a storage vessel containing a liquid. The liquid includes one or more catalytic materials. The storage vessel includes surfaces exposed to the liquid. The surfaces of the storage vessel are for producing substantially no contaminants into the liquid. The storage vessel is for coupling to or is coupled to a nebulizer. The nebulizer is for converting the liquid to an aerosol to be delivered into an intake air of a combustion zone. The aerosol includes the one or more catalytic materials, and the nebulizer includes surfaces for being exposed to the liquid or the aerosol. The surfaces of the nebulizer include a first surface for converting the liquid to the aerosol. The first surface is for being exposed to the liquid and the aerosol. The surfaces of the storage vessel, the surfaces of the nebulizer and the first surface are capable of producing substantially no contaminants into the liquid or the aerosol for over 200 hours of operation of the nebulizer or for over 1000 hours of exposure to the liquid or the aerosol.

According to another aspect, a fuel combustion catalyst delivery apparatus includes a nebulizer for coupling to or coupled to a storage vessel. The storage vessel contains a liquid. The liquid includes one or more catalytic materials. The nebulizer is for converting the liquid to an aerosol at a rate of once per second or more than once per second. The aerosol is for being delivered into an intake air of a combustion zone. The nebulizer includes a layer having holes for passing the liquid. Each of the holes has a size not greater than about 10 µm. The fuel combustion catalyst delivery apparatus of the present invention can deliver approximately from 0.5 ml to 5 ml of liquid as aerosol per hour.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

Figure 1:
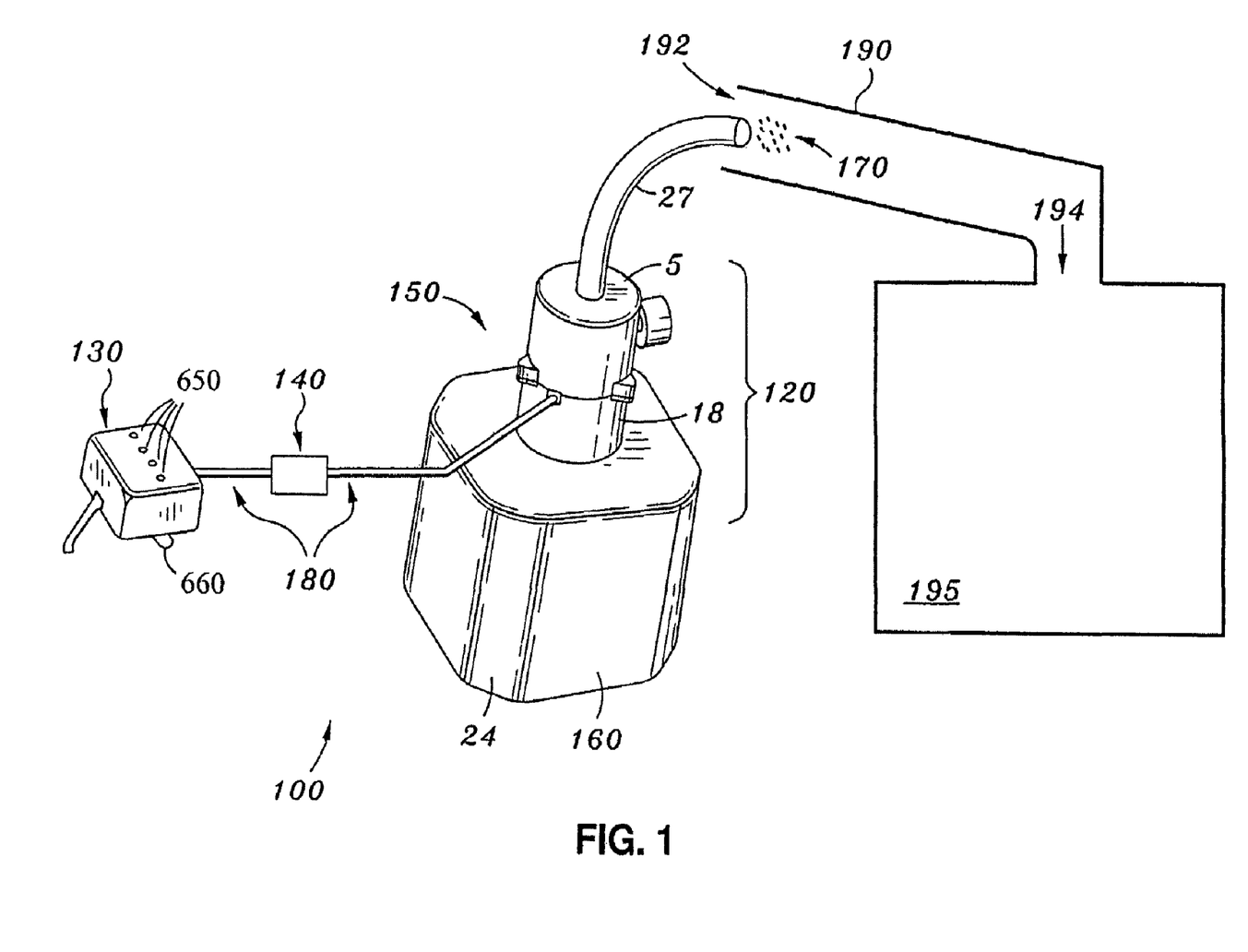
FIG. 1 illustrates an aerosol delivery system in accordance with one embodiment of the present invention.

Now referring to FIG. 1, an aerosol delivery system is illustrated in accordance with one embodiment of the present invention. An aerosol delivery system 100 may include a delivery unit 150. The delivery unit 150 may include a nebulizer 120 and a storage vessel 24. The nebulizer 120 may include an upper chamber 5 and a lower chamber 18.

The aerosol delivery system 100 may further include an electronic control module 130, a quick disconnect device 140, and a control wire 180. The quick disconnect device 140 may be used to quickly disconnect the electronic control module 130 from the delivery unit 150. The control wire 180 is used to send and receive signals between the electronic control module 130 and the delivery unit 150. In another embodiment, the electronic control module 130 may be a part of the delivery unit 150 or a part of the nebulizer 120.

The aerosol delivery system 100 may further include a mounting device such as a mounting tab 660. In another embodiment, the aerosol delivery system 100 may be placed in a mounting box having mounting tabs. The aerosol delivery system 100 may be mounted according to a variety of configurations.

According to one aspect of the present invention, the aerosol delivery system 100 may be a fuel combustion catalyst delivery device for providing an air born fuel combustion catalyst. The fuel combustion catalyst delivery device may include the storage vessel 24 containing a liquid 160. According to one embodiment, the storage vessel 24 is coupled to the nebulizer 120. In another embodiment, the storage vessel 24 and the nebulizer 120 may exist as separate units, for example, during shipping and handling, and then they are assembled together as shown in FIG. 1 for operation. In another embodiment, the storage vessel 24 may be attached to the nebulizer 120 by a delivery hose.

The nebulizer 120 can convert the liquid 160 to an aerosol 170 (e.g., a fog or mist) to be delivered into an intake air via an air intake duct 190 of a combustion zone (or a combustion chamber) 195, where the aerosol 170 can accelerate combustion. An aerosol delivery hose 27 may be coupled to the upper chamber 5 to deliver the aerosol 170 into the intake air via the air intake duct 190. According to one aspect, the aerosol 170 can be introduced into the combustion zone 195 by the vacuum created by a venturi effect in the air intake system.

A high catalytic effect on the combustion of fuel can be achieved by delivering the aerosol 170 (e.g., the catalyst in microburst fog) directly into the after-filtered air stream. By controlling the catalyst formulation, the size of the aerosol particles and the frequency at which the aerosol particles are delivered, the catalyst can perform at a high level based on the amount and type of fuel it is treating.

According to one aspect, the storage vessel 24 and the nebulizer 120 are made of materials suitable to be exposed to or in contact with the liquid 160 and the aerosol 170. The aerosol delivery system 100 may be placed in proximity to the combustion zone 195 (for example and without limitation in an engine compartment of a vehicle or within about 2 meters of the combustion zone 195) so that the aerosol 170 can be delivered into the intake air via the air intake duct 190 of the combustion zone 195 effectively.

According to one embodiment, the liquid 160 may be any liquid including, without limitation, water, alcohol, kerosene, oil, glycol, organic acid, ester or some combination thereof. According to one aspect, such liquid may be used as a carrier. According to one embodiment, the liquid 160 may include one or more of catalytic materials or non-catalytic materials or some combination thereof. Catalytic materials, which may be used as a fuel combustion catalyst, may include, without limitation, catalytic metals. Catalytic metals may include, without limitation, platinum, rhodium, rhenium, palladium, ruthenium, iridium, gold, aluminum, iron, molybdenum, cerium and tin and compounds thereof. Non-catalytic materials may include, without limitation, lithium, sodium, potassium, calcium and magnesium and compounds thereof. According to yet another embodiment, the liquid 160 may include one or more of precious or non-precious metals, compounds thereof or a combination thereof.

According to one aspect, the aerosol 170 may be used for oxidation and acceleration of any hydrocarbon based fuel. An aerosol delivery system of the present invention can reduce the amount of fuel consumed, reduce the exhaust emissions and increase the horsepower and/or torque available. The available carbon and soot for intrusion into the oil area (blow-by) of an engine is reduced, thereby reducing wear on the components and extending the engine life. There is also a reduction in oil replacement and consumption and filter replacement.

To further inhibit the formation of air born pollutants and reduce the intrusion of carbon and soot into the oil chamber and accelerate the combustion of hydrocarbons, thereby reducing the fuel consumption, the aerosol 170 containing the catalyst is simultaneously introduced into a combustion chamber with the intake air, at a point close to the combustion, in a concentrated form relative to the gallons or weight of fuel being consumed. The delivery method and system of the present invention serve both as a catalyst and as an accelerator in the combustion of hydrocarbons and achieve better performance and efficiency than other methods such as delivering a catalyst with the fuel.

The aerosol delivery system of the present invention can be utilized with any combustion including, without limitation, hydrocarbon combustions occurring in diesel engines, natural gas engines, gasoline engines, alterative-fueled engines, boilers, furnaces, turbines and any other open or closed flame applications.

Figure 2:
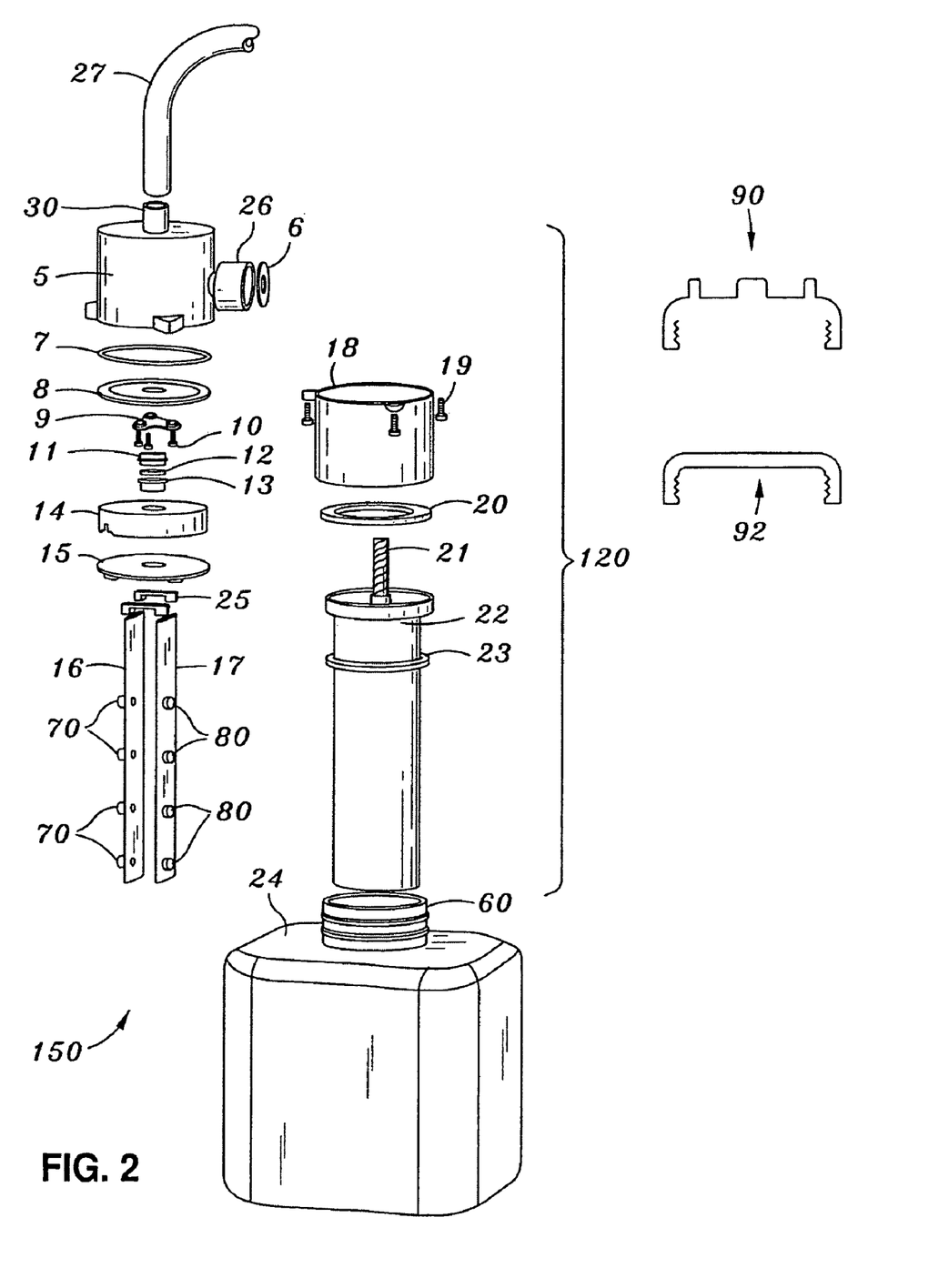
FIG. 2 is an exploded view of components of a delivery unit of an aerosol delivery system in accordance with one embodiment of the present invention.

FIG. 2 is an exploded view of components of a delivery unit of an aerosol delivery system in accordance with one embodiment of the present invention. The delivery unit 150 may include the following:

a nipple 30;
the upper chamber 5;
an air filter housing 26;
an air filter retaining ring 6;
an air seal 7;
an upper cover 8;
a disc clamp 9;
screws 10;
an upper disc holder 11;
a piezoelectric disc unit 12;
a lower disc holder 13;
a position ring 14;
a lower cover 15;
a first sensor rod 16;
a second sensor rod 17;
the lower chamber 18;
screws 19;
a liquid seal 20;
a wick 21;
a housing 22;
a liquid seal 23;
the storage vessel 24; and
spacers/holders 25.

Figure 3:
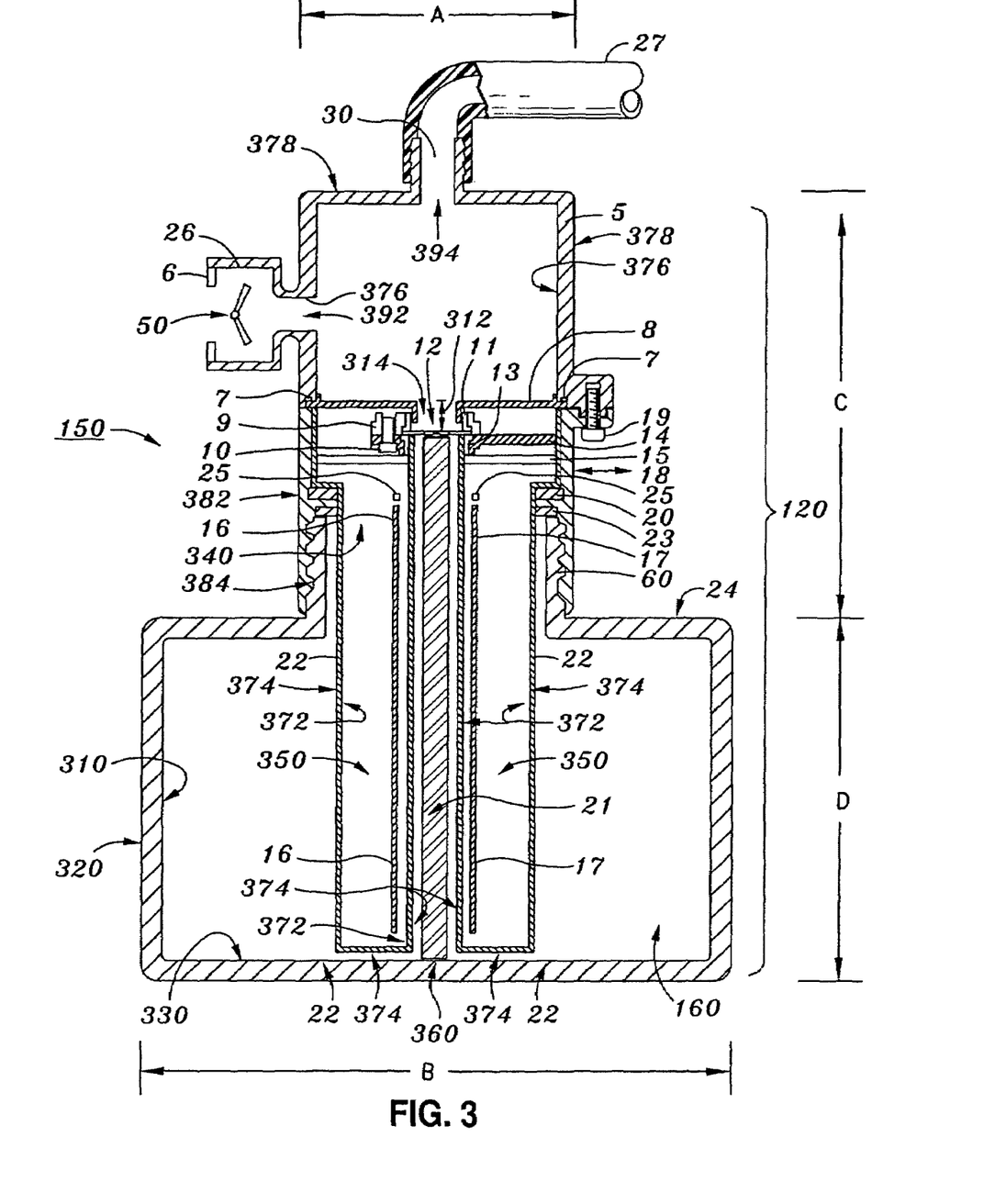
FIG. 3 is a cross-sectional view of an assembled delivery unit of an aerosol delivery system in accordance with one embodiment of the present invention.

FIG. 3 is a cross-sectional view of an assembled delivery unit in accordance with one embodiment of the present invention. The same numerical references are used in FIGS. 2 and 3 to show how the components are assembled together.

Referring to FIGS. 2 and 3, according to one embodiment, the air seal 7 and the upper cover 8 are placed into the upper chamber 5. The upper cover 8 is used to prevent the aerosol 170 produced within the upper chamber 5 from entering into the components of the nebulizer 120 located below the upper cover 8. The upper chamber 5 has inner surfaces 376 and outer surfaces 378. The upper chamber 5 further includes an inlet 392 for taking in air and an outlet 394 for ejecting the aerosol 170 and the air. An air filter (not shown) is inserted into the air filter housing 26. The air filter retaining ring 6 is fitted into the air filter housing 26 of the upper chamber 5 to retain the air filter in the air filter housing 26. The aerosol delivery hose 27 for transferring the aerosol 170 into the air intake duct 190 is placed onto the nipple 30.

The disc clamp 9, the screws 10, the upper disc holder 11, the piezoelectric disc unit 12, the lower disc holder 13, the position ring 14, the lower cover 15, the liquid seal 20 and the liquid seal 23 are placed into the lower chamber 18. The disc clamp 9 and the screws 10 are used to clamp the upper disc holder 11 and the lower disc holder 13 together. The piezoelectric disc unit 12 is placed between the upper disc holder 11 and the lower disc holder 13. The position ring 14 is used to position the upper disc holder 11, the piezoelectric disc unit 12 and the lower disc holder 13. The lower cover 15 is used to prevent the liquid 160 and the aerosol 170 from entering a dry portion 350 of the housing 22. The liquid seals 20 and 23 are used to prevent the liquid 160 from entering the dry portion 350.

The lower chamber 18 has inner surfaces 384 and outer surfaces 382. The upper chamber 5 is attached to the lower chamber 18 using the screws 19. In another embodiment, a low voltage miniature fan 50 may be placed within the air filter housing 26 to accelerate the air movement across the upper portion of the piezoelectric disc unit 12.

According to one embodiment, the storage vessel 24 includes inner surfaces 310 exposed to or in contact with the liquid 160 and outer surfaces 320. The storage vessel 24 also includes a neck area 60, a top opening 340 and a bottom surface 330. The first and second sensor rods 16 and 17 have light emitting diodes (LEDs) 70 and 80 and are attached to the spacers/holders 25. The housing 22 has inner surfaces 372 and outer surface 374. The housing 22 has the dry portion 350 bound by the inner surfaces 372. The dry portion 350 and the inner surfaces 372 are sealed off from the liquid 160 and are not exposed to the liquid 160. The outer surfaces 374 are exposed to the liquid 160. The first and second sensor rods 16 and 17, the LEDs 70 and 80 and the spacers/holders 25 are placed within the dry portion 350 of the housing 22 so that the electrical connections are not exposed to or in contact with the liquid 160.

The wick 21 is placed within a cylindrical open portion 360 of the housing 22 so that the wick 21 is exposed to or in contact with the liquid 160. The housing 22 protects and keeps in place the wick 21, the first and second sensor rods 16 and 17, the LEDs 70 and 80 and the spacers/holders 25 so that they are protected during packaging and shipping. The top portions of the first and second sensor rods 16 and 17, the wick 21 and the housing 22 are placed into the lower chamber 18, as shown in FIG. 3.

The lower portions of the first and second sensor rods 16 and 17, the wick 21 and the housing 22 are placed into the storage vessel 24. The lower portion of the housing 22 extends substantially to the bottom surface 330 of the storage vessel 24. The wick 21 also extends substantially to the bottom surface 330 so that substantially all of the liquid 160 can be consumed. The lower portions of the first and second sensor rods 16 and 17 extend substantially to the bottom surface 330 so that they can detect various levels of the liquid 160 from substantially full to empty.

The top portions of the first and second sensor rods 16 and 17 extend substantially to the top opening 340. The top portions of the wick 21 and the housing 22 extend substantially to the bottom of the piezoelectric disc unit 12.

According to one embodiment, the delivery unit 150 has the following general dimensions, but the present invention is not limited to these dimensions. The diameter A of the nebulizer 120 may be about 1 to 3 inches. The height C of the nebulizer 120 may be about 2 to 4 inches. The width B of the storage vessel 24 may be about 3 to 7 inches. The height D of the storage vessel 24 may be about 5 to 8 inches.

According to one embodiment, the nebulizer 120 (including, for example, the nipple 30, the upper chamber 5, the air filter housing 26, the air filter retaining ring 6, the fan 50, the air seal 7, the upper cover 8, the disc clamp 9, the screws 10, the upper disc holder 11, the piezoelectric disc unit 12, the lower disc holder 13, the position ring 14, the lower cover 15, the first sensor rod 16, the second sensor rod 17, the lower chamber 18, screws 19, the liquid seal 20, the wick 21, the housing 22, the liquid seal 23, and the spacers/holders 25) and the storage vessel 24 (with or without the liquid 160) are packaged together as one unit. In another embodiment, the storage vessel 24 and the nebulizer 120 may be packaged as two separate units. In this instance, a cap 92 in FIG. 2 may be placed on top of the storage vessel 24 sealing off the top opening 340 of the storage vessel 24.

According to another embodiment, the storage vessel 24 (with or without the liquid 160), the housing 22, the wick 21, the liquid seal 23, the first and second sensor rods 16 and 17, the LEDs 70 and 80, the lower cover 15 and the spacers/holders 25 are packaged together and shipped together as one unit. A cap 90 in FIG. 2 may be placed on top of the housing 22 and cover the housing 22, the wick 21, the spacers/holders 25, the first and second sensor rods 16 and 17, and the top opening 340 of the storage vessel 24. According to one embodiment, this unit is tamper-proof and sealed in a manner that the storage vessel 24 does not leak during shipment. To assemble the storage vessel 24 to the nebulizer 120, the cap 90 is removed, and the neck area 60 of the storage vessel 24 is screwed into the lower chamber 18 of the nebulizer 120. A variety of other configurations is possible for tamper-proof sealed packages.

Figure 7:
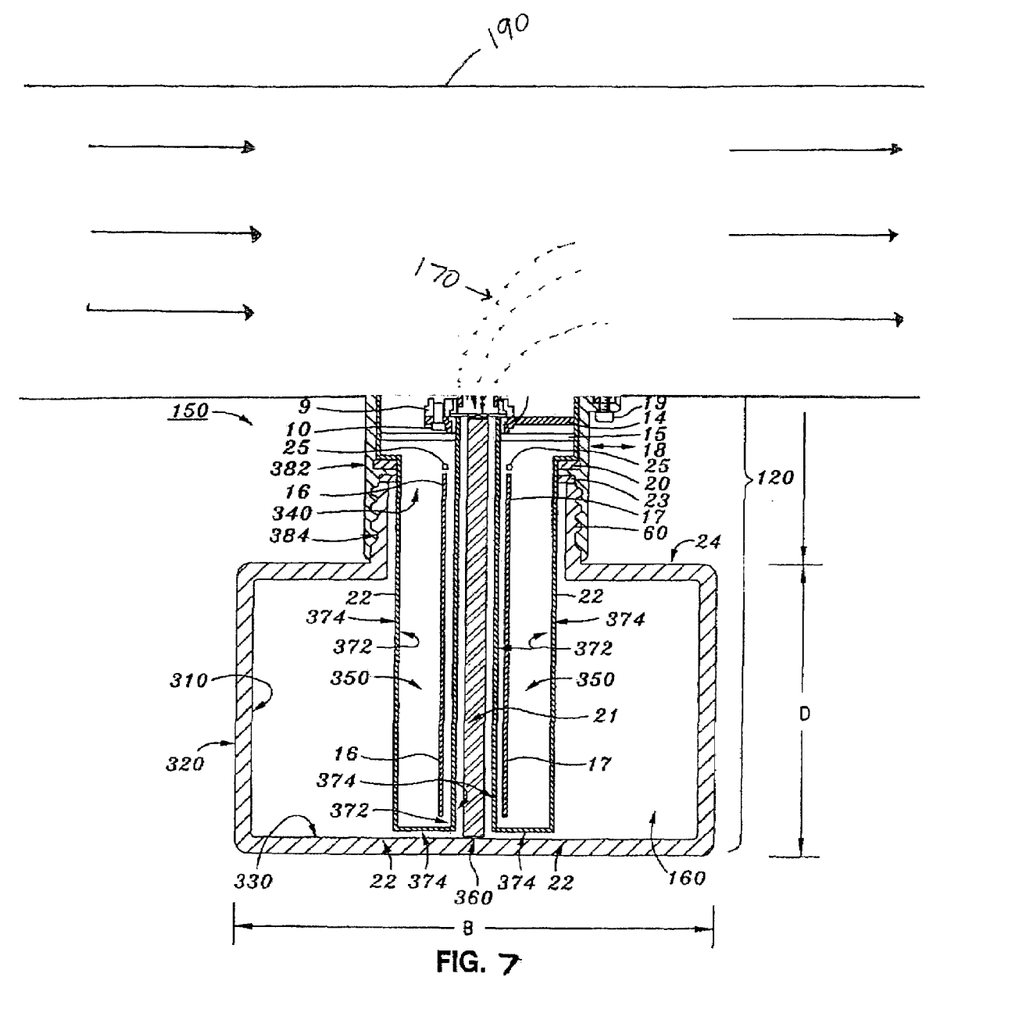
FIG. 7 is a cross-sectional view of an assembled delivery unit of an aerosol delivery system in accordance with one embodiment of the invention.

According to yet another embodiment shown in FIG. 7, the nebulizer 120 does not contain the upper chamber 5, and the components in the lower chamber 18 including without limitation the piezoelectric disc unit 12 can be placed directly into the air intake duct 190 which has an inlet 192 for taking in air and an outlet 194 for ejecting the aerosol 170 and air into the combustion zone 195.

Figure 4:
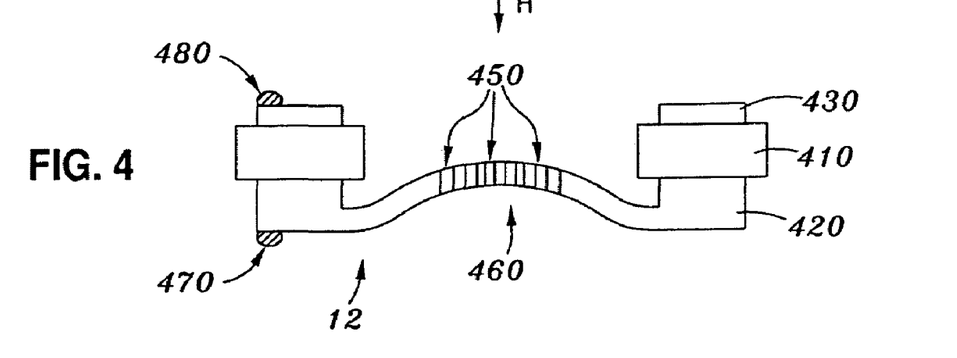
FIG. 4 illustrates a piezoelectric disc unit of an aerosol delivery system in accordance with one embodiment of the present invention.

FIG. 4 illustrates a piezoelectric disc unit of an aerosol delivery system in accordance with one embodiment of the present invention. The piezoelectric disc unit 12 may be an annular ring 410 having an opening in the center and made from a ceramic material or any material having piezoelectric properties. The piezoelectric disc unit 12 further includes a metal disc 420 attached to the lower surface of the annular ring 410. The metal disc 420 has a center curvature 460 and holes 450 within the center curvature 460. The center curvature 460 extends across the opening of the annular ring 410 and projects upward toward the annular ring 410. The piezoelectric disc unit 12 further includes a metal ring 430 attached to the upper surface of the annular ring 410. The metal ring 430 has an opening in its center. A first electrical contact 470 is placed onto the metal disc 420 and a second electrical contact 480 is placed onto the metal ring 430. The first and second electrical contacts 470 and 480 may be solder joints. The present invention is not limited to the exemplary configuration shown in FIG. 4, and it may employ other shapes and structures of a piezoelectric device.

According to one embodiment, when voltage is applied across the first electrical contact 470 on the metal disc 420 and the second electrical contact 480 on the metal ring 430, the annular ring 410 expands or contracts in the radial direction. This causes the metal disc 420 to vibrate vertically (perpendicular to the radial direction) along the direction H. The vibration of the metal disc 420 causes the liquid 160 in contact with the metal disc 420 to convert to the aerosol 170.

According to one embodiment, the ultrasonic vibration frequency of the metal disc 420 of the piezoelectric disc unit 12 depends at least on the type of liquid. For instance, the desired vibration frequency for an oil-based liquid is higher than the desired vibration frequency for a water-based liquid. As an example, the vibration frequency may be in the range of 0.33 MHz to 10 MHz (or 0.1 to 3 microseconds per period). If the vibration frequency is not suitable for the liquid in use, the piezoelectric disc unit 12 may produce aerosol particles that are too large or consume too much or too little liquid. Accordingly, the vibration frequency needs to be adjusted properly.

According to one embodiment, the metal disc 420 and the metal ring 430 may be made from any metal including without limitation tin, copper, aluminum, platinum, silver, gold or any metal alloy including without limitation a nickel-based alloy such as Inconel® 625, an iron-based alloy such as stainless steel, a copper-based alloy such as brass, or some combination thereof.

According to one embodiment, when the liquid 160 is acidic (for example and without limitation pH 2-4), each of the components of the piezoelectric disc unit 12 (e.g., the annular ring 410, the metal disc 420, the metal ring 430, the first and second electrical contacts 470 and 480) is made from or coated with a corrosion-resistant or inert material(s). For example, the annular ring 410 is made from a ceramic material and may be coated with an inert material such as a polymer. Each of the metal disc 420 and the metal ring 430 may be made from any metal including without limitation tin, copper, aluminum, platinum, silver, gold or some combination thereof that is plated with a corrosion-resistant material(s) such as platinum or gold or some combination thereof, or may be made from a metal alloy(s) including without limitation a nickel-based alloy such as Inconel® 625, an iron-based alloy such as stainless steel, a copper-based alloy such as brass, or some combination thereof. The first and second electrical contacts 470 and 480 may be coated with an inert material such as a polymer (e.g., Teflon®, plastic or rubber).

According to another embodiment, each of the components of the piezoelectric disc unit 12 may be made from materials that produce substantially no contaminants into the liquid 160 or the aerosol 170. The materials listed in the previous paragraph may be used for this purpose.

According to one embodiment, the metal disc 420 contains holes 450 to allow the liquid 160 to pass through. According to one embodiment, each of the holes 450 may have a diameter not greater than 20 µm (for example and without limitation 10 µm, 5 µm). In another embodiment, the diameter of each of the holes 450 is less than 5 µm (for example and without limitation 4 µm, 3 µm, 2 µm).

Now referring to FIGS. 1 through 4, according to one aspect, all of the components and surfaces of the delivery unit 150 (including the storage vessel 24 and the nebulizer 120) that are substantially exposed to or in contact with the liquid 160 or the aerosol 170 may be made from a corrosion-resistant or inert material(s). According to another aspect, all of the components and surfaces of the delivery unit 150 (including the storage vessel 24 and the nebulizer 120) that are substantially exposed to or in contact with the liquid 160 or the aerosol 170 may be made from materials that produce substantially no contaminants into the liquid 160 or the aerosol 170.

To provide corrosion-resistant or inert components or components that produce substantially no contaminants, materials including without limitation a polymer (for example and without limitation plastic and rubber) and ceramic may be used according to one embodiment. For metal components, corrosion-resistant metals including without limitation a nickel-based alloy such as Inconel® 625, an iron-based alloy such as stainless steel, a copper-based alloy such as brass or some combination thereof or metals plated with a corrosion-resistant metal such as gold or platinum may be used. Electrical connections and wires can be coated with an inert and non-contaminant inducing material(s) such as a polymer (for example and without limitation plastic, rubber or Teflon®).

According to one embodiment, to have corrosion-resistant or inert components or components that produce substantially no contaminants, the nipple 30, the upper chamber 5, the air filter housing 26, the upper cover 8, the disc clamp 9, the upper disc holder 11, the lower disc holder 13, the position ring 14, the lower cover 15, the first sensor rod 16, the second sensor rod 17, the lower chamber 18, the housing 22, the storage vessel 24 and the spacers/holders 25 (or at least the surfaces of these components that are exposed to the liquid 160 or the aerosol 170) may be made from a polymer or from different polymers. In one embodiment, the housing 22 is made of a transparent plastic material. In yet another embodiment, the first and second sensor rods 16 and 17 are made from fiber optics, a corrosion-resistant metal or a conductive material coated with an inert and non-contaminant inducing material.

Furthermore, according to one embodiment, the air seal 7 and the liquid seals 20 and 23 are made from a rubber material, and the screws 10 are stainless steel coated with an inert and non-contaminant inducing material. The wick 21 may be a synthetic material (e.g., a synthetic composite). In another embodiment, the wick 21 may be made from a natural material (e.g., cotton). In yet another embodiment, the wick 21 may be made from any material that provides wicking action.

All electrical connections and solder joints (e.g., solder joints for the piezoelectric disc unit 12 and the wire connections from the electronic control module 130 to the piezoelectric disc unit 12 or the first and second sensor rods 16 and 17) that are exposed to or in contact with acidic liquid or acidic aerosol may be coated with a polymer.

According to another aspect of the present invention, the delivery unit 150 and the electronic control module 130 are made from materials having a softening or deforming point above 200° F., or preferably above about 250° F. For example, the storage vessel 24 and the nebulizer 120 including all of the components within them are made from materials having a softening or deforming point above 200° F., or preferably above about 250° F. For plastic, there is a variety of high temperature plastic materials available.

According to one embodiment, if the aerosol delivery system 100 is placed into an engine compartment, the aerosol delivery system 100 may be exposed to −30° F. to 200° F. Accordingly, all of the components within the aerosol delivery system 100 need to be made from materials that can withstand the temperature range.

Referring to FIGS. 1 through 4, components such as the piezoelectric disc unit 12 and the first and second sensor rods 16 and 17 are controlled by the electronic control module 130 in FIG. 1, and they may be coupled to the electronic control module 130 via the control wire 180 in FIG. 1.

According to one aspect of the present invention, the storage vessel 24 may contain liquid initially in the amount between about 10 ml to 1000 ml (e.g., 100 ml or 500 ml), but the present invention is not limited to these amounts. The wick 21 provides capillary action to cause the liquid 160 to be brought up into contact with the bottom surface of the piezoelectric disc unit 12 (e.g., the lower surface of the metal disc 420 in FIG. 4).

Referring to FIGS. 1 through 4, when the electronic control module 130 turns on the piezoelectric disc unit 12, the disc 12 vibrates, and converts the liquid 160 in contact with the disc 12 into the aerosol 170. It takes only a small movement of air across the upper surface of the piezoelectric disc unit 12 to capture the aerosol 170 and transport them out of the nipple 30 of the nebulizer 120. In another embodiment, to improve the flow of the aerosol 170, the low-voltage fan 50 is placed in the air filter housing 26.

According to one embodiment, if the aerosol delivery system 100 is used as a fuel combustion catalyst delivery system, the aerosol 170 that is transported out of the nipple 30 is carried into the combustion zone 195. When the aerosol delivery hose 27 is placed into the air intake system of the combustion zone 195, the vacuum created by a venturi effect in the air intake system can deliver the aerosol 170 produced across the upper surface of the piezoelectric disc unit 12 in the upper chamber 5 into the combustion zone 195.

According to one aspect of the present invention, to deliver the correct amount of the aerosol 170 into the combustion zone 195, the electronic control frequency of the voltage supplied to the first and second electrical contacts 470 and 480 of the piezoelectric disc unit 12 ranges between one pulse per second to twenty pulses per second. The voltage causes the piezoelectric disc unit 12 to vibrate and convert the liquid 160 into the aerosol 170. In other words, the piezoelectric disc unit 12 is turned on at a pulse rate between one pulse per second and twenty pulses per second to produce the aerosol 170 at a rate between once per second and twenty times per second.

In another embodiment, the pulse rate may be one pulse per second or more than once per second up to about one hundred pulses per second. In other words, the piezoelectric disc unit 12 is turned on at a regular interval, and the regular interval may be once per second or more than once per second up to one hundred times per second to produce the aerosol 170 at a regular interval of once per second or more than once per second up to one hundred times per second.

By selecting the appropriate frequency of the pulse (which turns on the piezoelectric disc unit 12), the aerosol 170 can be provided to the combustion zone 195 continuously and consistently. While fuel combustion occurs in the combustion zone 195, the aerosol delivery system 100 of the present invention can provide a continuous and consistent stream of an aerosol 170 (or a continuous fog) into the intake air via the air intake duct 190 of the combustion zone 195 by having the piezoelectric disc unit 12 turned on at a regular interval, without having it turned on continuously or at all times.

The lower the number of pulses per second, the longer the volume of the liquid 160 will last. For example, depending on the frequency applied to the piezoelectric disc unit 12, the delivery unit 150 may deliver about 250 ml to 2500 ml of the liquid 160 as the aerosol 170 over about 500 hours of operation using two to eight pulses per second. Depending on the delivery rate of the liquid 160 as the aerosol 170, it may treat an engine consuming 15 gallons per hour or 7500 gallons of fuel.

According to one aspect of the present invention, the delivery rate of the liquid 160 as the aerosol 170 may be lower than 2 ml per hour. According to another aspect, the delivery unit 150 may deliver about 0.20 ml to 0.25 ml or about 1 ml to 1.5 ml of the liquid 160 as the aerosol 170 per hour for 400 to 500 hours or 700 to 800 hours. According to yet another aspect of the present invention, the delivery unit 150 may operate for over 100 hours, over 300 hours or over 2000 hours without substantially degrading the components of the delivery unit 150.

According to one aspect, the surfaces of the storage vessel 160 and the surfaces of the nebulizer 120 (including without limitation the surfaces of the piezoelectric disc unit 12) exposed to the liquid 160 or the aerosol 170 can maintain inertness for over x number of hours of operation of the nebulizer 120 where x may be any number between 150 and 2000 or for over y number of hours of exposure to the liquid 160 or the aerosol 170 where y may be any number between 1000 and 9000. According to another aspect, the surfaces of the storage vessel 160 and the surfaces of the nebulizer 120 (including without limitation the surfaces of the piezoelectric disc unit 12) exposed to the liquid 160 or the aerosol 170 are capable of producing substantially no contaminants into the liquid 160 or the aerosol 170 for over x number of hours of operation of the nebulizer 120 where x may be any number between 150 and 2000 or for over y number of hours of exposure to the liquid 160 or the aerosol 170 where y may be any number between 1000 and 9000.

According to one embodiment, the inner surfaces 310 of the storage vessel 24 are exposed to the liquid 160. Many of the components of the nebulizer 120 are exposed to or are for being exposed to the liquid 160 or the aerosol 170. These may include without limitation the inner surfaces of the upper chamber 5, the inner surfaces of the lower chamber 18, the inner surface of the nipple 30, the upper cover 8, the disc clamp 9, the screws 10, the upper disc holder 11, the piezoelectric disc unit 12 (including elements 410, 420, 430, 450, 460, 470, 480 in FIG. 4), the electrical wires 510 and 520 in FIG. 5, the lower disc holder 13, the position ring 14, the lower cover 15, the outer surfaces 374 of the housing 22, the wick 12, and the seals 20 and 23.

Figure 5:
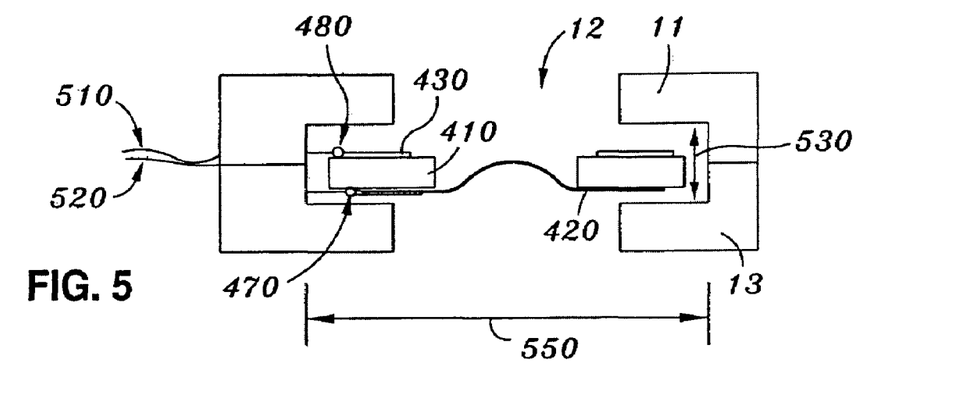
FIG. 5 is a cross-sectional view of components of a delivery unit in accordance with one embodiment of the present invention.

FIG. 5 shows a cross-sectional view of an assembly of the upper disc holder 11, the piezoelectric disc unit 12 and the lower disc holder 13 in accordance with one embodiment of the present invention. The upper disc holder 11 has an opening in the center to allow the aerosol 170 to escape from the piezoelectric disc unit 12, and the lower disc holder 13 has an opening in the center to allow the liquid 160 to reach the piezoelectric disc unit 12. The piezoelectric disc unit 12 is contained within the inner region having a height 530 and a width 550 defined by the inner surfaces of the upper disc holder 11 and the lower disc holder 13. According to one embodiment, the height 530 is about 0.5 mm to about 1.5 mm larger than the height of the piezoelectric disc unit 12.

The piezoelectric disc unit 12 is not mechanically attached to the upper disc holder 11, the lower disc holder 13 or any other component of the nebulizer 120. The piezoelectric disc unit 12 can move vertically within the height 530 and move horizontally within the width 550. The height 530 and the width 550 provide enough clearance for the piezoelectric disc unit 12 to move freely.

The upper disc holder 11 and the lower disc holder 13 are made from a polymer including without limitation a rubber material so that they are inert to the liquid 160 and the aerosol 170, they produce substantially no contaminants into the liquid 160 or the aerosol, and they do not substantially damage the piezoelectric disc unit 12 when the piezoelectric disc unit 12 collides with the surfaces of the upper disc holder 11 or the lower disc holder 13.

According to one embodiment, the upper disc holder 11 and the lower disc holder 13 forms an open polymer retention chamber for the piezoelectric disc unit 12. This retention chamber construction provides the ability not to use any springs such as metal springs, which may not be inert to the liquid 160 or the aerosol 170 and may produce contaminants into the liquid 160 or the aerosol 170. A retention chamber is not limited to the assembly of the upper disc holder 11 and the lower disc holder 13, and it may be constructed according to a variety of configurations.

The electrical wires 520 and 510 attached to the first electrical contact 470 and the second electrical contact 480, respectively, pass through a passage within either the upper disc holder 11 or the lower disc holder 13.

Referring to FIGS. 2 through 5, according to one embodiment, the upper chamber 5 can collect the aerosol 170 produced by the piezoelectric disc unit 12 and provide a directional flow of the aerosol 170 through the outlet 394. Because the upper chamber 5 and the lower chamber 18 are substantially air-tight and water-tight except for the inlet 392 in FIG. 3 for taking in air and the outlet 394 in FIG. 3 for ejecting the aerosol 170, the aerosol 170 flows generally in one direction rather than flowing in all directions. Accordingly, the flow of aerosol 170 is controllable.

According to one aspect, when the nebulizer 120 or the piezoelectric disc unit 12 is not in operation, the inlet 392 does not take in air, and because the piezoelectric disc unit 12 is enclosed in a chamber, there is substantially no airflow over the piezoelectric disc unit 12 (or the metal disc 420 in FIG. 4). According to another aspect, the upper cover 8 and the upper disc holder 11 create a well 314 having a height 312 over the piezoelectric disc unit 12. The well 314 further reduces the airflow over the piezoelectric disc unit (or the metal disc 420 in FIG. 4) when the nebulizer 120 or the piezoelectric disc unit 12 is not in operation. According to one embodiment, the height 312 is designed to be less than the distance the aerosol particles 170 travel up from the piezoelectric disc unit 12 when the aerosol particles 170 are produced so that the aerosol particles 170 are not trapped in the well 314.

One of the benefits of having substantially no airflow over the piezoelectric disc unit 12 when the nebulizer 120 is inactive is that substantially no deposits collect on the piezoelectric disc unit 12 or within the holes 450 in FIG. 4. If there is air movement over the piezoelectric disc unit 12 when the nebulizer 120 or the piezoelectric disc unit 12 is not in operation, the air can dry the liquid 160 and solids from the liquid 160 can deposit on the piezoelectric disc unit 12 clogging up the holes 450.

Figure 6:
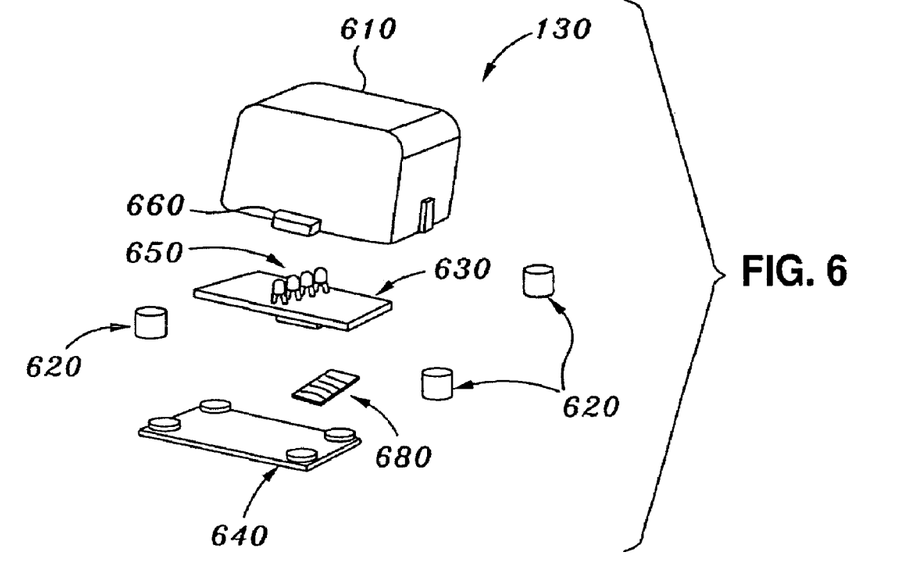
FIG. 6 shows components of an electronic control system of an aerosol delivery system in accordance with one embodiment of the present invention.

FIG. 6 shows components of an electronic control system of an aerosol delivery system in accordance with one embodiment of the present invention. The electronic control module 130 may include an upper electronic housing unit 610, rubber keys 620, a central processing unit (CPU) or a processor 630, LEDs 650, a lower electronic housing unit 640, and a battery 680. The upper electronic housing unit 610 may include the mounting tab 660.

According to one embodiment, the delivery unit 150 of FIG. 2 may be controlled by the electronic control module 130 that is energized by a system it is mounted in/on. For example, if the electronic control module 130 is mounted in an engine compartment, it can use the DC voltage system common to that vehicle or equipment. In another embodiment, the electronic control module 130 may be operated using the battery 680. The battery 680 may be a power source of the aerosol delivery system 100. It may be also used to provide power to retain information and data on the CPU 630.

Referring to FIGS. 1 through 6, according to one embodiment, the electronic control module 130 includes a program in the CPU 630 that would allow the electronic control module 130 to recognize the various levels of the liquid 160 remaining in the storage vessel 24 using sensors such as the first and second sensor rods 16 and 17 having the LEDs 70 and 80. The electronic control module 130 may send an electrical signal to the first and second sensor rods 16 and 17 to read the level of the liquid 160 using the LEDs 70 and 80. The LEDs 650 can indicate, for example, whether the storage vessel 24 is substantially full, ¾ full, ½ full, ¼ full or empty.

In another embodiment, the electronic control module 130 may be equipped with a vibration sensor to control the operational cycles of the nebulizer 120 (e.g., turning on or off the nebulizer 120). For instance, for a vehicle or equipment, which creates vibration while fuel combustion is taking place, the electronic control module 130 can determine when to operate the nebulizer 120 by monitoring vibration of the vehicle or the equipment. For example, when the engine of a vehicle runs, the engine produces vibration, and when the electronic control module 130 detects vibration, it keeps the nebulizer 120 in operation. When the engine of the vehicle stops, the vibration sensor does not detect vibration, and the electronic control module 130 turns off the nebulizer 120.

According to another embodiment, the electronic control module 130 can evaluate the fuel consumption to control the output of the aerosol 170. One exemplary way to evaluate the fuel consumption is to monitor a fuel consumption computer of a vehicle or equipment. According to yet another embodiment, the electronic control module 130 can recognize high voltage or spikes to protect the electronic control module 130 and the delivery unit 150.

In another embodiment, the electronic control module 130 can record the total time each storage vessel is used or consumed, the total time all of the storage vessels are used, and the number of times storage vessels have been replaced.

In yet another embodiment, the electronic control module 130 can immobilize or disable the delivery unit 150 (e.g., the nebulizer 120) from further use when the liquid 160 has been consumed to prevent refilling or injecting with incorrect catalyst solutions. For example, the electronic control module 130 can monitor the levels of the liquid 160. When the level of the liquid 160 goes from full to empty, the electronic control module 130 can disable the nebulizer 120 so that it cannot be turned on again.

In another aspect, the electronic control module 130 can disable the nebulizer 120 when the storage vessel 24 is refilled after the liquid 160 has been consumed either partially or entirely. For example, if the level of the liquid 160 goes from full to ¼ full, and then it goes to ¾ full, then the electronic control module 130 detects that the storage vessel 24 has been refilled and disables the nebulizer 120. In yet another aspect, the electronic control module 130 can disable the nebulizer 120 when the storage vessel 24 is opened (e.g., unscrewed from the nebulizer 120) to prevent refilling or injecting with incorrect catalyst solutions.

According to one embodiment of the present invention, the aerosol delivery system 100 is portable and disposable. According to another aspect, the aerosol delivery system 100 is small enough to fit into an engine compartment of any size vehicle. It should be noted that a nebulizer is not limited to a piezoelectric ultrasonic vibrator and may employ other types of nebulizer that can convert a liquid to an aerosol.

According to another embodiment, when the aerosol delivery system 100 is placed in a rough environment such as an engine compartment of a vehicle (e.g., cars, trucks, airplanes, boats), a generator or construction equipment, the components of the aerosol delivery system 100 need to be made in a manner to withstand the vibration. For example, the housing 22 and the spacers/holders 25 hold the first and second sensor rods 16 and 17 in place, and the cylindrical open portion 360 of the housing 22 holds the wick 21 in place to help the delivery unit 150 operate properly even in a rough environment. Various positioning and holding devices (e.g., the upper cover 8, the disc clamp 9, the screws 10 and 19, the upper disc holder 11, the lower disc holder 13, the position ring 14 and the lower cover 15) are used to keep the components in place even when the aerosol delivery system 100 is in motion. The present invention is not limited to the exemplary positioning and holding devices shown in FIGS. 1 through 4 and may employ other devices or structures.

The present invention is not limited to delivering a fuel combustion catalyst, and it may deliver a variety of aerosols including without limitation medication. In this case, the liquid 160 and the aerosol 170 do not contain a catalytic metal or materials suitable for combustion, but rather medicine. In a medication aerosol delivery system, the surfaces and components that are exposed to or in contact with the liquid 160 are substantially inert and introduce substantially no contaminants into the liquid 160. According to another aspect, the medication aerosol delivery system may be lightweight, small, portable and disposable. According to yet another aspect, the medication aerosol delivery system may have similar pulse rates, delivery rates, frequency rates and extended period of operation as described in the foregoing paragraphs.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention. For example, the components described with reference to FIGS. 1 through 6 may be replaced with other types of components. Some of the components may be eliminated, and some new components may be added in alternate embodiments. Furthermore, the component structures and shapes are not limited to those shown in FIGS. 1 through 6, and a variety of different structures and shapes may be employed.

What is claimed is:

1. A fuel combustion catalyst delivery apparatus comprising:

a storage vessel containing a liquid, the liquid including one or more catalytic materials, the storage vessel including surfaces exposed to the liquid, the surfaces of the storage vessel being inert to the liquid, the storage vessel for coupling to or coupled to a nebulizer, the nebulizer for converting the liquid to an aerosol to be delivered into an intake air of a combustion zone, the aerosol including the one or more catalytic materials, the nebulizer including surfaces for being exposed to the liquid or the aerosol, the surfaces of the nebulizer including a first surface for converting the liquid in contact with the first surface to the aerosol, the first surface for being exposed to the liquid and the aerosol, the surfaces of the nebulizer being inert to the liquid or the aerosol, the surfaces of the first surface being inert to the liquid and the aerosol, the surfaces of the storage vessel, the surfaces of the nebulizer and the first surface capable of maintaining inertness for over 200 hours of operation of the nebulizer or for over 1000 hours of exposure to the liquid or the aerosol, wherein the nebulizer includes a piezoelectric device and wires; the piezoelectric device includes a first surface and electrical contacts; the surfaces of the nebulizer include surfaces of the piezoelectric device, the electrical contacts and the wires; wherein the surfaces of the piezoelectric device, the electrical contacts and the wires are for being exposed to the liquid or the aerosol; the surfaces of the piezoelectric device, the electrical contacts and the wires are inert to the liquid or the aerosol; and wherein the nebulizer further includes a retention chamber containing the piezoelectric device; the piezoelectric device is not mechanically attached to the retention chamber or any other component of the nebulizer; the surfaces of the nebulizer include surfaces of the retention chamber; the surfaces of the retention chamber are for being exposed to the liquid or the aerosol; and the surfaces of the retention chamber are inert to the liquid or the aerosol.

2. The fuel combustion catalyst delivery apparatus of claim 1, wherein the nebulizer comprises: a chamber including the first surface, an inlet for air, and an outlet for at least the aerosol, wherein the surfaces of the nebulizer include surfaces of the chamber for being exposed to the liquid or the aerosol, and the surfaces of the chamber are inert to the liquid or the aerosol.

3. The fuel combustion catalyst delivery apparatus of claim 2, wherein the chamber is for collecting the aerosol and for providing a directional flow of the aerosol through the outlet.

4. The fuel combustion catalyst delivery apparatus of claim 1, wherein the materials of the storage vessel and the nebulizer that are for being exposed to the liquid or the aerosol are made from one or more of a polymer, a corrosion-resistant metal or a material coated with an inert material.

5. The fuel combustion catalyst delivery apparatus of claim 1, wherein the liquid is acidic, and the liquid includes one or more of the following metals or compounds thereof: platinum, rhodium, rhenium, palladium, ruthenium, iridium, gold, aluminum, cerium, molybdenum and tin.

6. A fuel combustion catalyst delivery apparatus comprising:
a storage vessel containing a liquid, the liquid including one or more catalytic materials, the storage vessel including surfaces exposed to the liquid, the surfaces of the storage vessel for introducing substantially no contaminants into the liquid, the storage vessel for coupling to or coupled to a nebulizer,
the nebulizer for converting the liquid to an aerosol to be delivered into an intake air of a combustion zone, the aerosol including the one or more catalytic materials, the nebulizer including surfaces for being exposed to the liquid or the aerosol,
the surfaces of the nebulizer including a first surface for converting the liquid to the aerosol, the first surface for being exposed to the liquid and the aerosol,
the surfaces of the storage vessel, the surfaces of the nebulizer and the first surface capable of introducing substantially no contaminants into the liquid or the aerosol for over 200 hours of operation of the nebulizer or for over 1000 hours of exposure to the liquid or the aerosol,
the nebulizer comprising a wick introducing substantially no contaminants into the liquid or the aerosol; and
a housing protecting and holding the wick in place, the housing producing substantially no contaminants into the liquid or the aerosol, at least a portion of the wick and a portion of the housing placed within the storage vessel,
wherein the storage vessel includes a bottom surface, wherein the wick and the housing extend substantially to the bottom surface, and
wherein the storage vessel contains the liquid, the storage vessel coupled to the nebulizer, and the liquid is acidic.

7. The fuel combustion catalyst delivery apparatus of claim 6, wherein the nebulizer further comprises:

one or more sensor devices for sensing the level of the liquid, at least a portion of the one or more sensor devices contained in the storage vessel and extending substantially to the bottom surface, the one or more sensor devices producing substantially no contaminants into the liquid or the aerosol.

8. The fuel combustion catalyst delivery apparatus of claim 7, wherein the storage vessel, the housing and the one or more sensor devices are made from one or more polymers, and the wick is made from a synthetic material, and
wherein the housing contains the one or more sensor devices, and the one or more sensor devices are substantially not in contact with the liquid or the aerosol.

9. A fuel combustion catalyst delivery apparatus comprising:
a nebulizer for coupling to or coupled to a storage vessel, the storage vessel containing a liquid, the liquid including one or more catalytic materials, the nebulizer for converting the liquid to an aerosol at a rate of once per second or more than once per second, the aerosol for being delivered into an intake air of a combustion zone, the nebulizer including a layer having holes for passing the liquid, each of the holes having a size not greater than about 10 µm,
wherein the nebulizer includes a retention chamber, the retention chamber includes a piezoelectric device for producing the aerosol by vibration, the piezoelectric device for vibrating and moving within the retention chamber, the piezoelectric device is not mechanically attached to the retention chamber, and the piezoelectric device includes a ceramic layer and a corrosion-resistant conductive layer.

10. The fuel combustion catalyst delivery apparatus of claim 9, wherein the size of the holes is not greater than 5 µm.

11. The fuel combustion catalyst delivery apparatus of claim 9, wherein the nebulizer is for being turned on between four and eight times per second, and a vibration frequency of the layer for converting the liquid to the aerosol is between 0.33 MHz and 10 MHz.

12. The fuel combustion catalyst delivery apparatus of claim 9, wherein the liquid is for being convened into the aerosol at a rate of about 10 ml to 1000 ml over about 500 hours of operation.

13. The fuel combustion catalyst delivery apparatus of claim 9, wherein the storage vessel contains the liquid, the storage vessel is attached to the nebulizer, and the nebulizer is for being disabled to prevent the nebulizer from being operated using a refilled liquid or a different liquid.

14. The fuel combustion catalyst delivery apparatus of claim 9, wherein the storage vessel is made from one or more materials having a softening or deforming point above about 200° F., and wherein the nebulizer includes one or more components, and all of the one or more components of the nebulizer are made from one or more materials having a softening or deforming point above about 200° F.

15. The fuel combustion catalyst delivery apparatus of claim 14, wherein the one or more materials of the storage vessel include one or more high temperature plastics, and the one or more components of the nebulizer include one or more high temperature plastics.

16. A fuel combustion catalyst delivery apparatus comprising:
a nebulizer for coupling to or coupled to a storage vessel, the storage vessel containing a liquid, the liquid including one or more catalytic materials, the nebulizer for converting the liquid to an aerosol at a rate of once per second or more than once per second, the aerosol for being delivered into an intake air of a combustion zone, the nebulizer including a layer having holes for passing the liquid, each of the holes having a size not greater than about 10 μm, and a control module and one or more sensors for recognizing the level of the liquid remaining in the storage vessel, wherein at least a portion of the one or more sensors is placed within the storage vessel, the storage vessel contains the liquid, and the storage vessel is coupled to the nebulizer.

17. A fuel combustion catalyst delivery apparatus comprising:

a nebulizer for coupling to or coupled to a storage vessel, the storage vessel containing a liquid, the liquid including one or more catalytic materials, the nebulizer for converting the liquid to an aerosol at a rate of once per second or more than once per second, the aerosol for being delivered into an intake air of a combustion zone, the nebulizer including a layer having holes for passing the liquid, each of the holes having a size not greater than about 10 μm, and a control module and a vibration sensor, the vibration sensor for monitoring vibration of a vehicle or equipment to determine whether combustion is occurring, the control module for allowing the nebulizer to operate while the vibration is detected and for turning off the nebulizer when the vibration is not detected.

18. A fuel combustion catalyst delivery apparatus comprising:

a nebulizer for coupling to or coupled to a storage vessel, the storage vessel containing a liquid, the liquid including one or more catalytic materials, the nebulizer for converting the liquid to an aerosol at a rate of once per second or more than once per second, the aerosol for being delivered into an intake air of a combustion zone, the nebulizer including a layer having holes for passing the liquid, each of the holes having a size not greater than about 10 μm, and a control module for evaluating fuel consumption to control an output of the aerosol.

19. A fuel combustion catalyst delivery apparatus comprising:

a nebulizer for coupling to or coupled to a storage vessel, the storage vessel containing a liquid, the liquid including one or more catalytic materials, the nebulizer for converting the liquid to an aerosol at a rate of once per second or more than once per second, the aerosol for being delivered into an intake air of a combustion zone, the nebulizer including a layer having holes for passing the liquid, each of the holes having a size not greater than about 10 μm, and a control module for recording the total time the storage vessel is used, for recording the number of times storage vessels are replaced, wherein the nebulizer is coupled to the storage vessel.

20. The fuel combustion catalyst delivery apparatus of claim 17, wherein the nebulizer is for being disabled when the liquid contained in the storage vessel is consumed, wherein the nebulizer is coupled to the storage vessel.

21. The fuel combustion catalyst delivery apparatus of claim 18, wherein the nebulizer is for being disabled when the storage vessel is refilled, wherein the nebulizer is coupled to the storage vessel.

22. The fuel combustion catalyst delivery apparatus of claim 19, wherein the nebulizer is for being disabled when the storage vessel is opened, wherein the nebulizer is coupled to the storage vessel.

23. A fuel combustion catalyst delivery apparatus comprising:

a nebulizer for coupling to or coupled to a storage vessel, the storage vessel containing a liquid, the liquid including one or more catalytic materials, the nebulizer for converting the liquid to an aerosol at a rate of once per second or more than once per second, the aerosol for being delivered into an intake air of a combustion zone, the nebulizer including a layer having holes for passing the liquid, each of the holes having a size not greater than about 10 μm, and wherein the nebulizer includes a chamber, and the chamber includes the layer for converting the liquid to the aerosol, the chamber includes a well above the layer, wherein the chamber and the well substantially prevent airflow over the layer when the nebulizer is not in operation.

* * * * *